(12) United States Patent
Chiu et al.

(10) Patent No.: US 11,281,012 B1
(45) Date of Patent: Mar. 22, 2022

(54) AUGMENTED REALITY GLASSES

(71) Applicant: Acer Incorporated, New Taipei (TW)

(72) Inventors: Yi-Jung Chiu, New Taipei (TW);
Shih-Ting Huang, New Taipei (TW);
Yen-Hsien Li, New Taipei (TW);
Tsung-Wei Tu, New Taipei (TW);
Wei-Kuo Shih, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/083,332

(22) Filed: Oct. 29, 2020

(30) Foreign Application Priority Data

Sep. 16, 2020 (TW) ................................. 109131884

(51) Int. Cl.
*G02B 27/01* (2006.01)
*G06T 19/00* (2011.01)

(52) U.S. Cl.
CPC ........ *G02B 27/0172* (2013.01); *G06T 19/006* (2013.01); *G02B 2027/0178* (2013.01); *G02B 2027/0187* (2013.01)

(58) Field of Classification Search
CPC ............ G02B 27/0101; G02B 27/0149; G02B 27/0172; G02B 27/0916; G02B 27/18; G02B 2027/0152; G06F 1/163; G06F 1/1639; G06F 3/011; G06F 3/013
See application file for complete search history.

(56) References Cited

U.S. PATENT DOCUMENTS 10,571,694 B2   2/2020   Ha
2018/0203236 A1*  7/2018  Shih ...................... G02B 6/005
2018/0292651 A1  10/2018  Ha
2019/0086668 A1   3/2019  Ha
2019/0094981 A1   3/2019  Bradski et al.
2020/0073127 A1*  3/2020  Takeda ............... G02B 27/0149
2020/0096763 A1   3/2020  Shin et al.
2020/0103651 A1*  4/2020  Ando .................. G02B 27/4261

FOREIGN PATENT DOCUMENTS

WO    2019132468    7/2019
WO    2019132474    7/2019
WO    2020004690    1/2020

OTHER PUBLICATIONS

Zhanjun Yan et al., "Surface Micro-Reflector Array for Augmented Reality Display", IEEE Photonics Journal, Apr. 2020, pp. 1-7.

* cited by examiner

*Primary Examiner* — Nelson M Rosario
(74) *Attorney, Agent, or Firm* — JCIPRNET

(57) ABSTRACT

Augmented reality glasses are provided. The augmented reality glasses are adapted to be put on in front of the eyes of a user. The augmented reality glasses include at least one image source and a plurality of reflecting mirrors. The at least one image source is configured to provide at least one image beam to the eyes, and the at least one image beam has a plurality of sub-beams. The plurality of reflecting mirrors are disposed on a path of the at least one image beam to respectively reflect the sub-beams. The at least one image beam has at least one first width before being incident on the reflecting mirrors and has at least one second width after being reflected by the reflecting mirrors. The at least one second width is greater than the at least one first width.

21 Claims, 7 Drawing Sheets

AUGMENTED REALITY GLASSES

CROSS-REFERENCE TO RELATED APPLICATION

This application claims the priority benefit of Taiwan application serial no. 109131884, filed on Sep. 16, 2020. The entirety of the above-mentioned patent application is hereby incorporated by reference herein and made a part of this specification.

BACKGROUND OF THE INVENTION

1. Field of the Invention

The invention relates to an optical apparatus, and in particular, to augmented reality glasses.

2. Description of Related Art

With the advancement of display technologies, an augmented reality display technology gradually becomes popular and is widely used in people's life. The augmented reality technology enables human eyes to simultaneously see a real object and a virtual image, and the virtual image can interact with the real object.

However, further efforts are still required for the current augmented reality technology. For example, the human eyes cannot focus on the virtual image and the real object simultaneously during interaction, and the virtual image itself may even exhibit a vergence-accommodation conflict (VAC). Specifically, when image light provided by a virtual reality apparatus enters the eyes, the left and right eyes respectively focus on a virtual imaging position seen by the left eye and a virtual imaging position seen by the right eye. However, the brain construes the position at which direct sights of the two eyes intersect as the image position. When the focus positions of the two eyes are different from the position at which the direct sights of the two eyes intersect, the human brain may be confused, and such confusion may easily result in dizziness. Such phenomenon is referred to as a VAC phenomenon.

In addition, since the augmented reality technology is related to near-to-eye display optics, if a visible range (i.e., an eye box) is less than a pupil of the eye, the image perceived by the eye may be distorted, incorrectly rendered, or even no content of the image is displayed. Therefore, how to provide a sufficient visible range while taking into account field of view is also an issue to work on.

SUMMARY OF THE INVENTION

The invention provides augmented reality glasses which induces no vergence-accommodation conflict and has a sufficient visible range and a field of view.

An embodiment of the invention provides augmented reality glasses adapted to be worn in front of an eye of a user. The augmented reality glasses include at least one image source and a plurality of reflecting mirrors. The at least one image source is configured to provide at least one image beam to the eye, where the at least one image beam has a plurality of sub-beams. The plurality of reflecting mirrors are disposed on a path of the at least one image beam to respectively reflect the sub-beams. The at least one image beam has at least one first width before being incident on the reflecting mirrors and has at least one second width after being reflected by the reflecting mirrors. The at least one second width is greater than the at least one first width.

Based on the above, the augmented reality glasses provided in the embodiments of the invention reflect the image beam through the plurality of reflecting mirrors. Since the reflecting mirrors may generate a large depth of field, a large focusing range is provided for a virtual image. Therefore, a vergence-accommodation conflict can be avoided. In addition, the image beam has a larger width after being reflected by the reflecting mirrors. As a result, the visible range is increased.

In order to make the above features and advantages of the invention more comprehensible, a detailed description is made below with reference to the accompanying drawings by using embodiments.

DESCRIPTION OF THE EMBODIMENTS

Figure 1A:
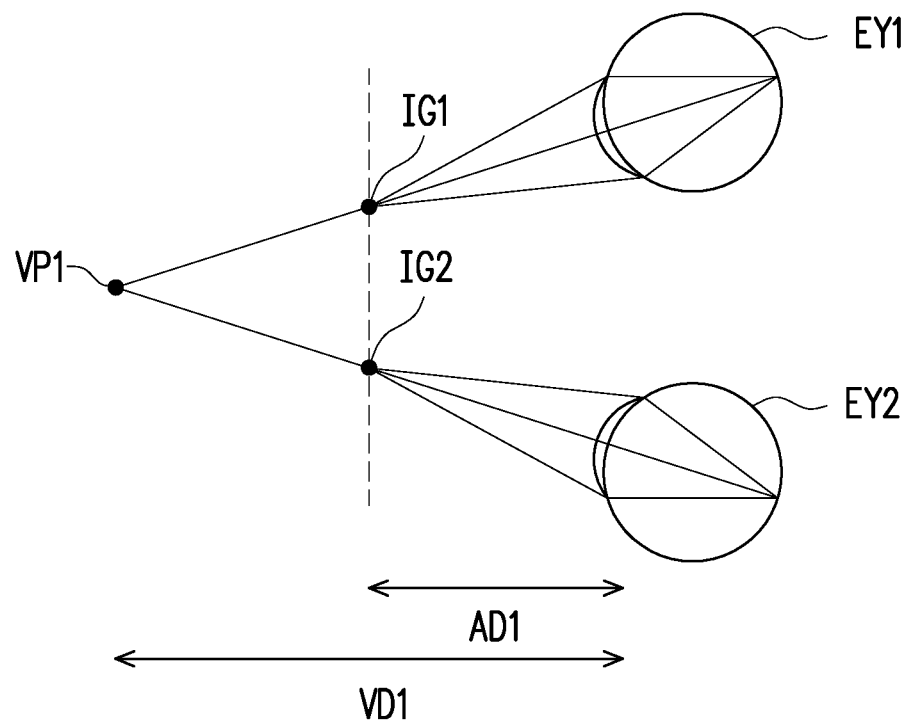
FIG. 1A is a schematic diagram of a visual behavior of human eyes.

Referring to FIG. 1A, FIG. 1A is a schematic diagram of a visual behavior of human eyes. In FIG. 1A, similar to working principles of augmented reality glasses, an image source provides image beams to eyes EY1 and EY2 respectively. It should be noted herein that for clarity of description, the image source and the image beams incident on the eyes are not shown in FIG. 1A, and only an optical path corresponding to a virtual image generated by the image beam is shown. In this example, the image beam causes the eyes EY1 and EY2 to verge at a position VP1 (that is, the position VP1 at which direct sights of the eyes EY1 and EY2 intersect), and causes a user's brain to consider that an image is seen at the position VP1. However, the eyes EY1 and EY2 focus on positions IG1 and IG2, respectively. It may be learned that respective monocular focusing distances AD1 of the eyes EY1 and EY2 are different from a binocular vergence distance VD1. Because the monocular focusing distance AD1 does not match the binocular vergence distance VD1, which violates a normal visual physiological mechanism, confusion in the human brain may be caused, and dizziness may be easily generated, that is, a vergence-accommodation conflict is caused.

Figure 1B:
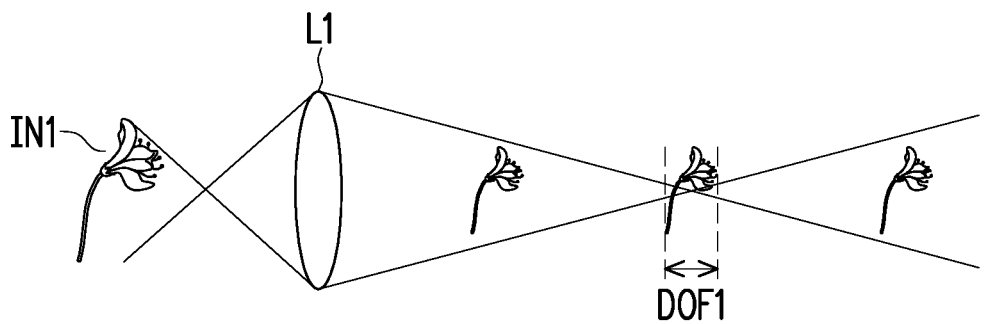
FIG. 1B is a schematic diagram of lens imaging and pinhole imaging.
Figure 1B:
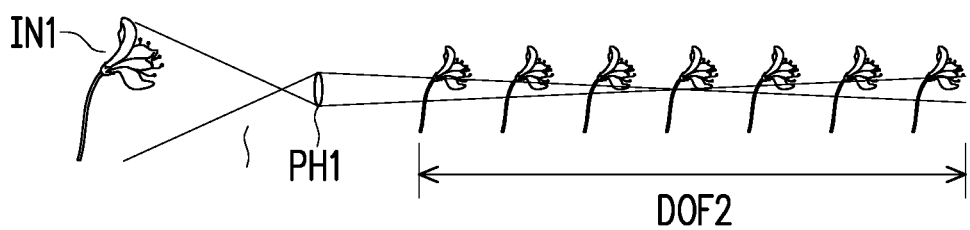

In order to relieve the above vergence-accommodation conflict, referring to FIG. 1B, FIG. 1B is a schematic diagram of lens imaging and pinhole imaging. In FIG. 1B, the image source provides an image beam IN1. When passing through a lens L1 for imaging, the image beam IN1 has a depth of field DOF1. When passing through a pinhole PH1 for imaging, the image beam IN1 has a depth of field DOF2. It may be learned that the depth of field DOF2 for pinhole imaging is larger than the depth of field DOF1 for lens imaging. Specifically, a pinhole effect may be used to increase the depth of field. Therefore, for the vergence-accommodation conflict shown in FIG. 1A, the pinhole effect may be used to increase the depth of field and a focusing range of the eyes, so as to cause the eyes to verge within a range of the depth of field, thereby avoiding the vergence-accommodation conflict.

Figure 2:
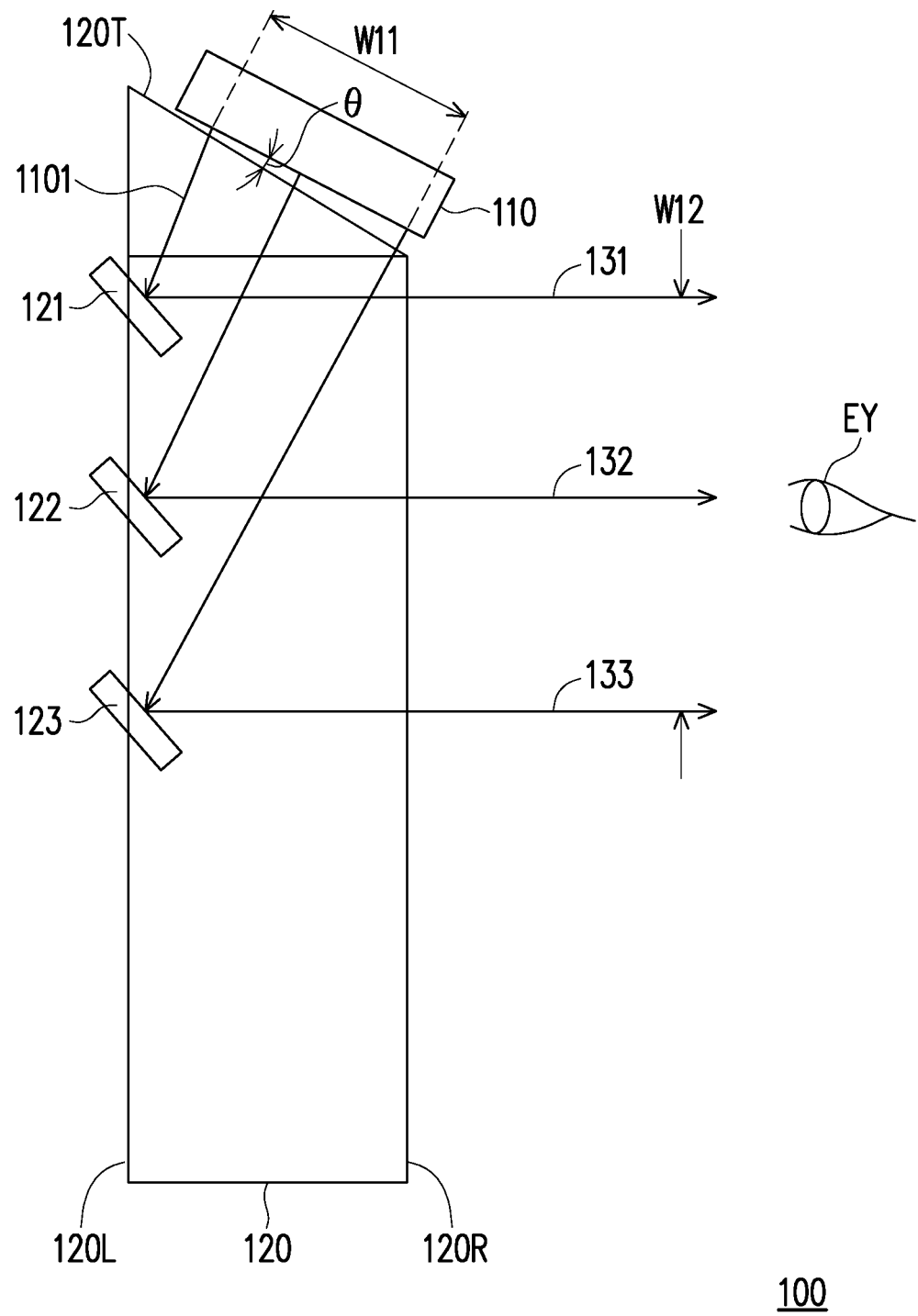
FIG. 2, FIG. 3A, FIG. 3B, and FIG. 4 are each a schematic diagram of augmented reality glasses according to an embodiment of the invention.

Referring to FIG. 2, FIG. 2 is a schematic diagram of augmented reality glasses according to an embodiment of the invention. Augmented reality glasses 100 are adapted to be worn in front of an eye EY of a user. The augmented reality glasses 100 include an image source 110 and a plurality of reflecting mirrors 121-123. The image source 110 provides an image beam 1101. The image beam 1101 has a plurality of sub-beams 131-133. The image beam 1101 travels toward the eye EY after being reflected by the reflecting mirrors 121-123. The reflecting mirror 121 reflects the sub-beam 131, the reflecting mirror 122 reflects the sub-beam 132, and the reflecting mirror 123 reflects the sub-beam 133. The image beam 1101 has a first width W11 before being incident on the plurality of reflecting mirrors 121-123, and has a second width W12 after being reflected by the plurality of reflecting mirrors 121-123. The second width W12 is greater than the first width W11. Specifically, by appropriately arranging positions and orientations of the image source 110 and the plurality of reflecting mirrors 121-123, a width of the image beam 1101 may be increased from the first width W11 to the second width W12, thereby providing a sufficient visible range.

It should be noted that the eye EY may be a right eye and/or a left eye of the user. For example, the augmented reality glasses 100 provide the image beam 1101 to only the right eye or the left eye of the user, or provide the image beam 1101 to both of the right eye and the left eye of the user.

According to an embodiment of the invention, the augmented reality glasses 100 further include a light-transmitting plate 120. The light-transmitting plate 120 includes a first surface 120L away from the eye EY, a second surface 120R close to the eye EY, and a third surface 120T close to the image source 110. The plurality of reflecting mirrors 121-123 are disposed on the first surface 120L. After being reflected by the plurality of reflecting mirrors 121-123, the image beam 1101 is emitted from the second surface 120R of the light-transmitting plate 120 to be transmitted toward the eye EY of the user. According to an embodiment of the invention, the light-transmitting plate 120 may be a lens. After the eye EY receives the image beam 1101 from the second surface 120R, the image beam 1101 is imaged on a retina, and a virtual image is sensed in front of the eye EY. In addition, light from an external object may sequentially penetrate the first surface 120L and the second surface 120R to be transmitted to the eye EY. In this way, the user can simultaneously see the image provided by the image source 110 and the external object, thereby achieving an effect of augmented reality.

According to an embodiment of the invention, a maximum width of each of the plurality of reflecting mirrors 121-123 is less than 3 mm. Therefore, each of the plurality of reflecting mirrors has a pinhole effect, so that the image beam 1101 entering the eye EY has a large depth of field. For the augmented reality glasses 100 providing the image beam 1101 to both of the right eye and the left eye of the user, the plurality of reflecting mirrors 121-123 with the pinhole effect reflect the image beam 1101 to the eyes of the user. A virtual image generated by the image beam 1101 has a large depth of field, and the eyes can verge at a position within a range of the depth of field, thereby avoiding a vergence-accommodation conflict. In some embodiments, some of the plurality of reflecting mirrors 121-123 may be curved reflecting mirrors with a pinhole effect.

According to an embodiment of the invention, the image source 110 of the augmented reality glasses 100 may be a display panel, and a display surface of the display panel provides the image beam 1101. An included angle θ exists between the display surface of the display panel and the third surface 120T of the light-transmitting plate 120. The included angle θ may be greater than or equal to zero degrees. By changing the angle θ, angles at which the plurality of sub-beams 131-133 are incident on the plurality of reflecting mirrors 121-123 may be changed, thereby changing directions in which the plurality of sub-beams 131-133 travel after being reflected by the plurality of reflecting mirrors 121-123 and changing the second width W12. It should be noted that the image source 110 of the augmented reality glasses 100 is not limited to the display panel. In some embodiments, the image source 110 may be a projector.

Figure 3A:
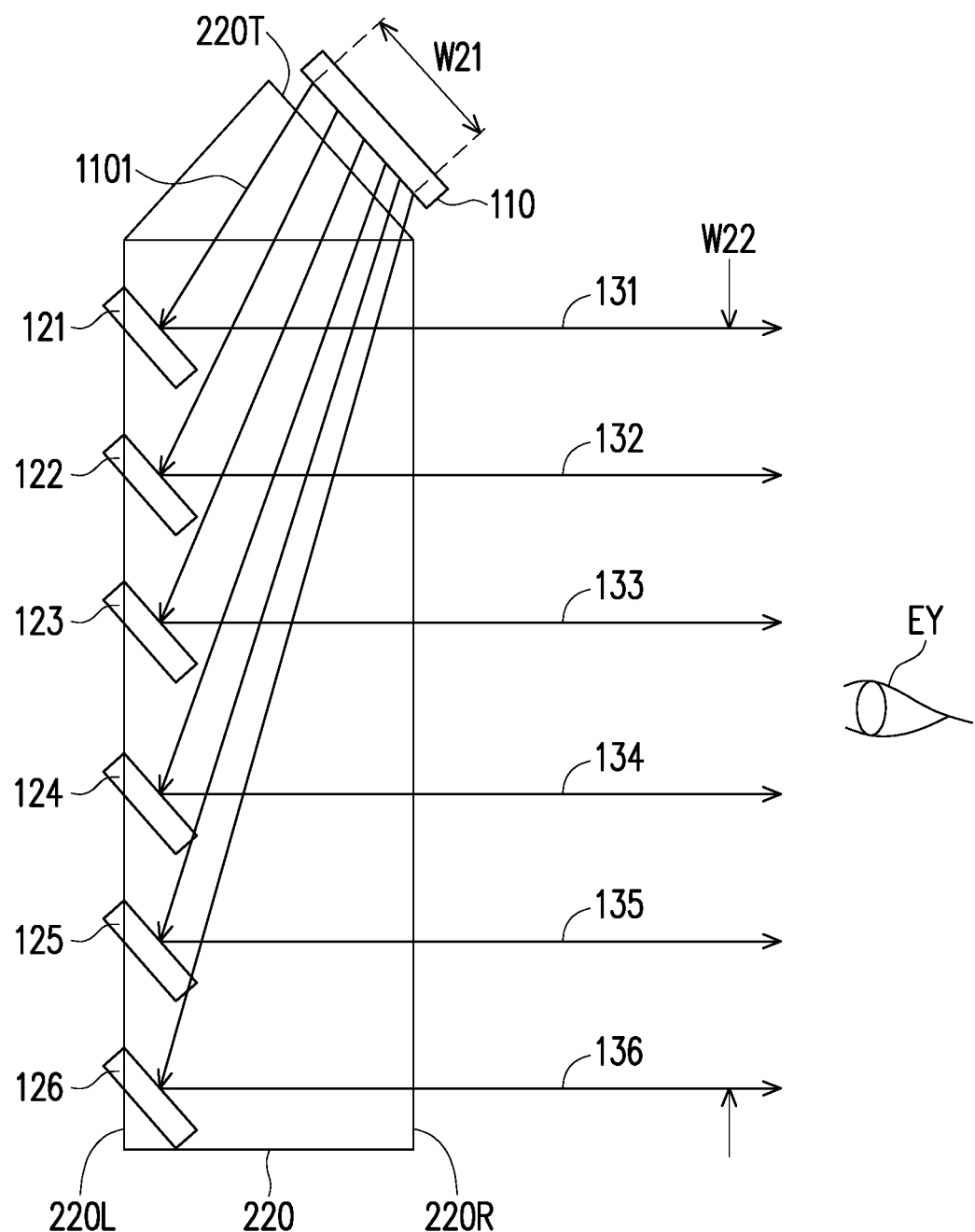
Figure 3B:
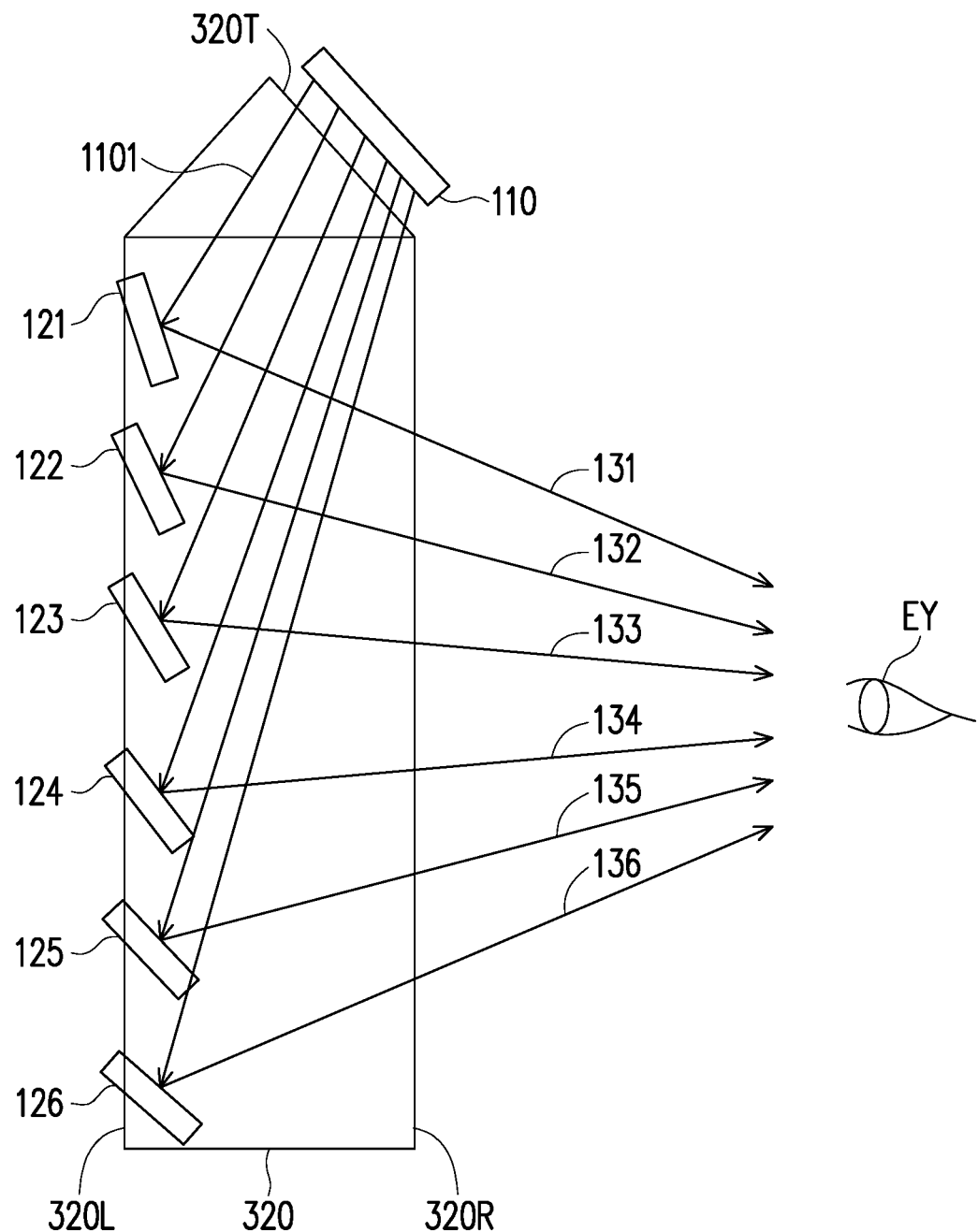

Referring to FIG. 3A and FIG. 3B, FIG. 3A and FIG. 3B are each a schematic diagram of augmented reality glasses according to an embodiment of the invention. In FIG. 3A, augmented reality glasses 200 include an image source 110, a light-transmitting plate 220, and a plurality of reflecting mirrors 121-126. The light-transmitting plate 220 has a first surface 220L, a second surface 220R, and a third surface 220T. The image source 110 provides an image beam 1101. The image beam 1101 has a plurality of sub-beams 131-136. The plurality of sub-beams 131-136 enter the light-transmitting plate 220 from the third surface 220T of the light-transmitting plate 220. The plurality of reflecting mirrors 121-126 are disposed on the first surface 220L of the light-transmitting plate 220, and angles at which the plurality of sub-beams 131-136 are respectively incident on the plurality of reflecting mirrors 121-126 are different from each other. The reflecting mirror 121 reflects the sub-beam 131, the reflecting mirror 122 reflects the sub-beam 132, the reflecting mirror 123 reflects the sub-beam 133, the reflecting mirror 124 reflects the sub-beam 134, the reflecting mirror 125 reflects the sub-beam 135, and the reflecting mirror 126 reflects the sub-beam 136. After being reflected by the plurality of reflecting mirrors 121-126, the plurality of sub-beams 131-136 are emitted out of the light-transmitting plate 220 via the second surface 220R of the light-transmitting plate 220 and travel toward an eye EY. The image beam 1101 has a first width W21 before being incident on the plurality of reflecting mirrors 121-126, and has a second width W22 after being reflected by the plurality of reflecting mirrors 121-126. The second width W22 is greater than the first width W21. Specifically, by appropriately arranging positions and orientations of the image source 110 and the plurality of reflecting mirrors 121-126, a width of the image beam 1101 may be increased from the first width W21 to the second width W22, thereby providing a sufficient visible range, that is, extending an eye box.

In comparison to the augmented reality glasses 200 in FIG. 3A, in FIG. 3B, augmented reality glasses 300 also include an image source 110, a light-transmitting plate 320, and a plurality of reflecting mirrors 121-126. The light-transmitting plate 320 has a first surface 320L, a second surface 320R, and a third surface 320T. The image beam 1101 enters the light-transmitting plate 320 from the third surface 320T of the light-transmitting plate 320. After being respectively reflected by the reflecting mirrors 121-126, the plurality of sub-beams 131-136 of the image beam 1101 are emitted out of the light-transmitting plate 320 via the second surface 320R of the light-transmitting plate 320 and travel toward the eye EY. A difference between the augmented reality glasses shown in FIG. 3B and FIG. 3A is that orientations of the plurality of reflecting mirrors 121-126 in the light-transmitting plate 320 are different from orientations of the plurality of reflecting mirrors 121-126 in the light-transmitting plate 220. Specifically, in comparison to the plurality of reflecting mirrors 121-126 in FIG. 3A, normal lines of the plurality of reflecting mirrors 121-126 in FIG. 3B are not parallel to each other, and the plurality of sub-beams 131-136 incident on the eye EY provide a larger field of view. In other words, by changing the orientations of the plurality of reflecting mirrors 121-126, the field of view of the eye EY is increased.

Specifically, when the light-transmitting plate (for example, a lens) of the augmented reality glasses has a fixed size, a larger visible range indicates a smaller field of view. Oppositely, a smaller visible range indicates a larger field of view. However, according to the example of the present embodiment, the plurality of reflecting mirrors 121-126 are disposed in the light-transmitting plate 320 of the augmented reality glasses 300, and the orientations of the plurality of reflecting mirrors 121-126 are appropriately configured, so that the augmented reality glasses 300 may have a good visible range and a good field of view.

Figure 4:
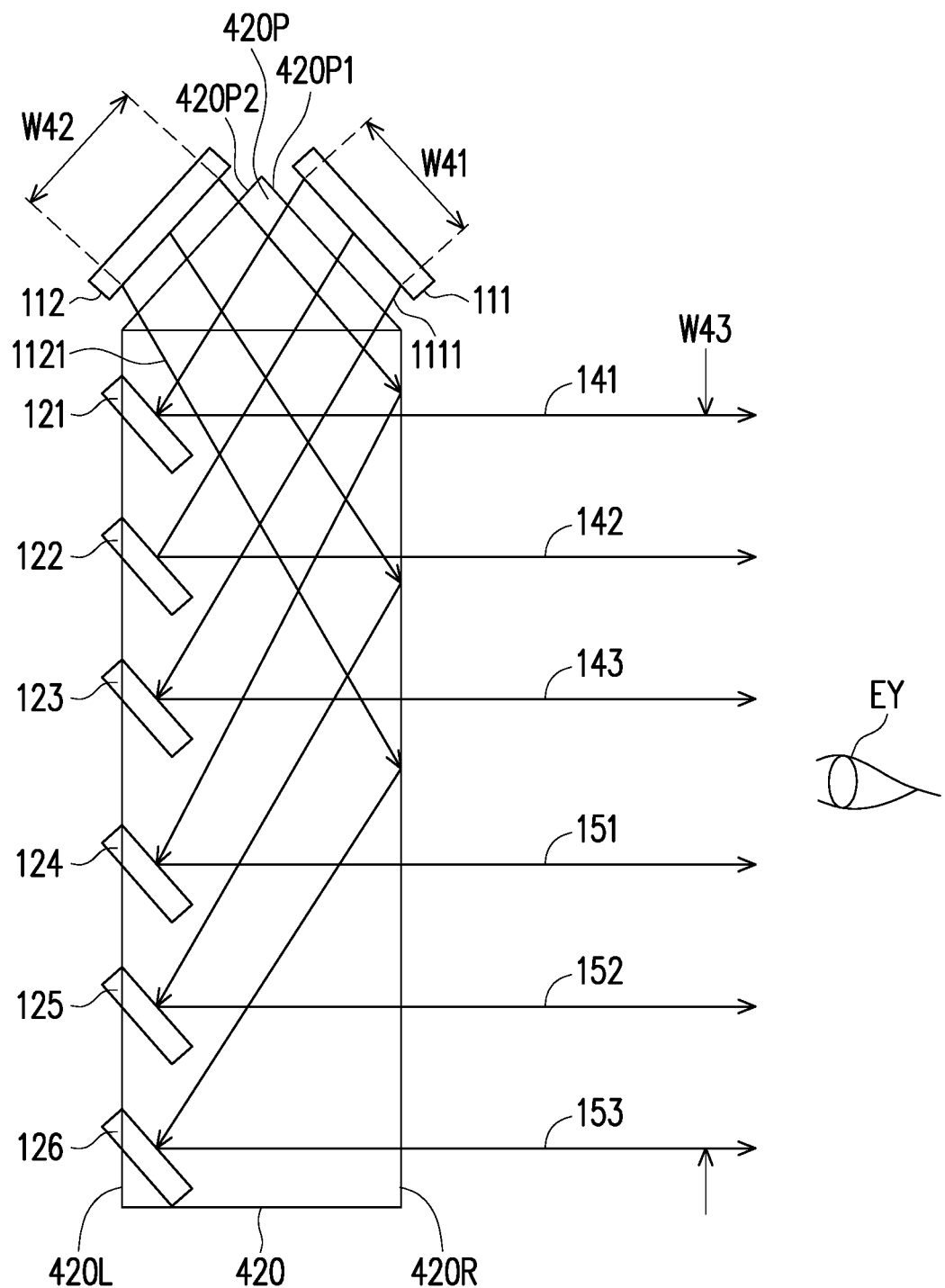

Referring to FIG. 4, FIG. 4 is a schematic diagram of augmented reality glasses according to an embodiment of the invention. Augmented reality glasses 400 include a first image source 111, a second image source 112, a light-transmitting plate 420, and a plurality of reflecting mirrors 121-126. The light-transmitting plate 420 includes a first surface 420L, a second surface 420R, and a prism 420P. The prism 420P has a first surface 420P1 and a second surface 420P2. The plurality of reflecting mirrors 121-126 are disposed on a first surface 420L of the light-transmitting plate 420. The first image source 111 provides an image beam 1111, and the image beam 1111 is incident on the plurality of reflecting mirrors 121-123 from the first surface 420P1 of the prism 420P. The second image source 112 provides an image beam 1121. After being incident on the light-transmitting plate 420 from the second surface 420P2 of the prism 420P, the image beam 1121 is reflected (for example, completely reflected) on the second surface 420R of the light-transmitting plate 420, then incident on the plurality of reflecting mirrors 124, 125, and 126, and then reflected by the plurality of reflecting mirrors 124-126. Specifically, the image beam 1111 has a plurality of sub-beams 141-143, and the image beam 1121 has a plurality of sub-beams 151-153. The sub-beam 141 is reflected by the reflecting mirror 121, the sub-beam 142 is reflected by the reflecting mirror 122, and the sub-beam 143 is reflected by the reflecting mirror 123. After being reflected on the second surface 420R of the light-transmitting plate 420, the sub-beam 151 is reflected by the reflecting mirror 124. After being reflected on the second surface 420R of the light-transmitting plate 420, the sub-beam 152 is reflected by the reflecting mirror 125. After being reflected on the second surface 420R of the light-transmitting plate 420, the sub-beam 153 is reflected by the reflecting mirror 126. Then the plurality of sub-beams 141-143 and the plurality of sub-beams 151-153 are emitted from the second surface 420R of the light-transmitting plate 420 and travel toward the eye EY. In some embodiments, the plurality of sub-beams 151-153 are completely reflected on the second surface 420R of the light-transmitting plate 420, and then are respectively incident on the plurality of reflecting mirrors 124-126.

It should be noted that an included angle between a normal line of the first surface 420P1 of the prism 420P and a normal line of the second surface 420R of the light-transmitting plate 420 is different from an included angle between a normal line of the second surface 420P2 of the prism 420P and a normal line of the second surface 420R of the light-transmitting plate 420. The image beam 1111 has a width W41 before being incident on the first surface 420P1 of the prism 420P, and the image beam 1121 has a width W42 before being incident on the second surface 420P2 of the prism 420P. With the above arrangement relationship between the first surface 420P1 of the prism 420P, the second surface 420P2 of the prism 420P, and the second surface 420R of the light-transmitting plate 420, and through appropriate configuration of the positions and the orientations of the plurality of reflecting mirrors 121-126, a total width W43 of the image beam 1111 and the image beam 1121 emitted from the second surface 420R of the light-transmitting plate 420 is greater than the width W41 and the width W42, thereby providing a good visible range. In some embodiments, the orientations of the plurality of reflecting mirrors 121-126 of the augmented reality glasses 400 may be further changed, so that normal lines of some of the plurality of reflecting mirrors 121-126 are not parallel to each other, thereby obtaining both a good visible range and a good field of view.

Figure 5:
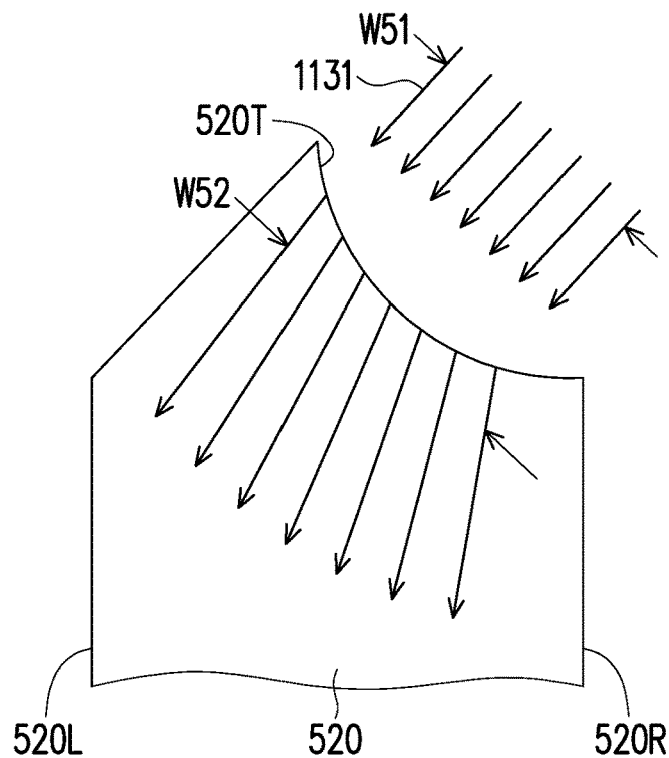
FIG. 5 and FIG. 6 are each a schematic diagram of a part of a structure of augmented reality glasses according to an embodiment of the invention.
Figure 6:
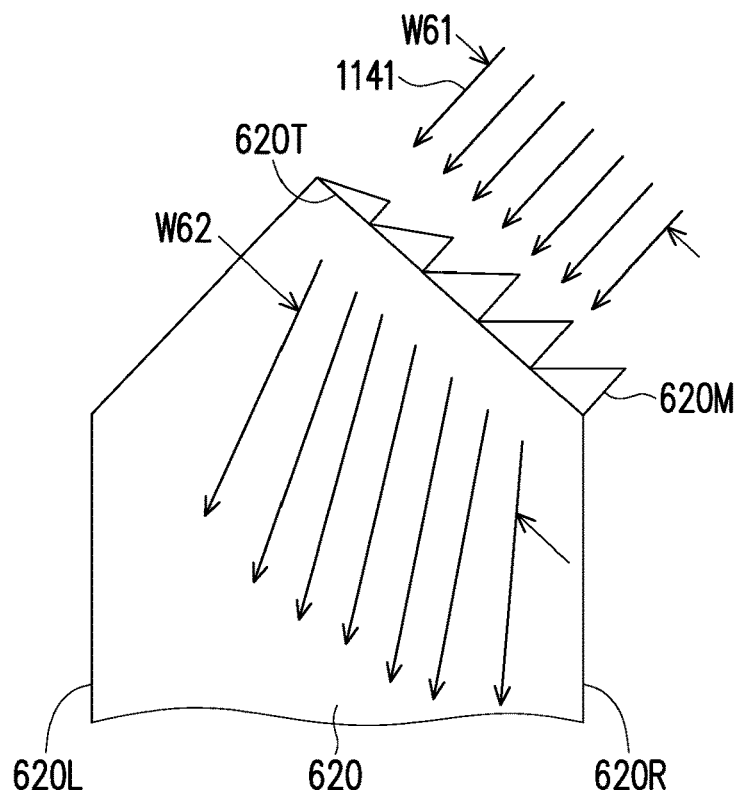

Next, referring to FIG. 5 and FIG. 6, FIG. 5 and FIG. 6 are each a schematic diagram of a part of a structure of augmented reality glasses according to an embodiment of the invention. In FIG. 5, an image beam 1131 emitted from an image source (not shown) enters a light-transmitting plate 520. It should be noted that, for description, FIG. 5 illustrates only a part of a structure of the light-transmitting plate 520, and other structures of the light-transmitting plate 520 are omitted, to avoid blurring an understanding focus.

The light-transmitting plate 520 has a first surface 520L, a second surface 520R, and a third surface 520T. The third surface 520T of the light-transmitting plate 520 is a curved surface, which may be considered as an implementation of the third surface 120T of the light-transmitting plate 120, the third surface 220T of the light-transmitting plate 220, and the third surface 320T of the light-transmitting plate 320 in the above embodiments.

Since the third surface 520T is a curved surface, and the image beam 1131 is refracted (from a thin medium to a dense medium) on the third surface 520T, it may be learned that the image beam 1131 has a width W51 before penetrating the third surface 520T, and has a width W52 after penetrating the third surface 520T and entering the light-transmitting plate 520. The width W52 is greater than the width W51. In addition, the image beam 1131 has a larger divergence angle after penetrating the third surface 520T than before penetrating the third surface 520T.

Since the image beam 1131 has a larger divergence angle after penetrating the third surface 520T, the plurality of sub-beams of the image beam 1131 can be respectively incident on the plurality of reflecting mirrors (not shown) disposed on, for example, the first surface 520L of the light-transmitting plate 520, achieving the effects of avoiding a vergence-accommodation conflict and providing a good visible range and a good field of view, and the like in the above embodiments. For detailed descriptions of the reflection of the image beam on the plurality of reflecting mirrors, reference may be made to the detailed descriptions of the above embodiments, and the descriptions thereof are omitted herein.

In FIG. 6, an image beam 1141 emitted from an image source (not shown) enters a light-transmitting plate 620. The light-transmitting plate 620 has a first surface 620L, a second surface 620R, and a third surface 620T. The third surface 620T of the light-transmitting plate 620 has a microstructure 620M, and the third surface 620T may be considered as an implementation of the third surface 120T of the light-transmitting plate 120, the third surface 220T of the light-transmitting plate 220, and the third surface 320T of the light-transmitting plate 320 in the above embodiments.

In the present embodiment, a cross section of the microstructure 620M has a plurality of triangles, but the invention is not limited thereto. The cross section of the microstructure 620M may have other shapes other than the triangle. The microstructure 620M is disposed such that a width W62 of the image beam 1141 after penetrating the third surface 620T is greater than a width W61 of the image beam 1141 before penetrating the third surface 620T. In addition, the image beam 1141 has a larger divergence angle after penetrating the third surface 620T than before penetrating the third surface 620T.

Since the image beam 1141 has a larger divergence angle after penetrating the third surface 620T, the plurality of sub-beams of the image beam 1141 can be respectively incident on the plurality of reflecting mirrors (not shown) disposed on, for example, the first surface 620L of the light-transmitting plate 620, achieving the effects of avoiding a vergence-accommodation conflict and providing a good visible range and a good field of view, and the like in the above embodiments. For detailed descriptions of the reflection of the image beam on the plurality of reflecting mirrors, reference may be made to the detailed descriptions of the above embodiments, and the descriptions thereof are omitted herein.

Figure 7:
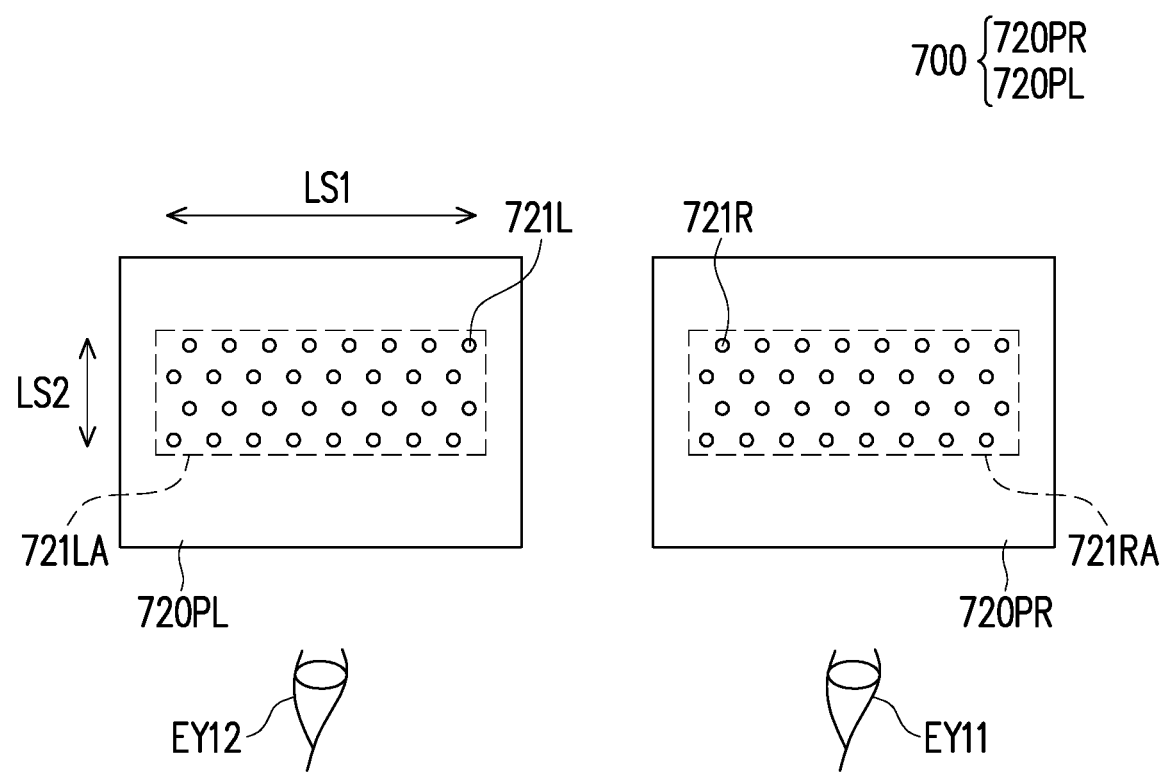
FIG. 7 is a schematic plan view of a part of a structure of augmented reality glasses according to an embodiment of the invention.

Next, referring to FIG. 7, FIG. 7 is a schematic plan view of a part of a structure of augmented reality glasses according to an embodiment of the invention. Augmented reality glasses 700 include light-transmitting plates 720PR and 720PL respectively disposed corresponding to a right eye EY11 and a left eye EY12 of a user. Specifically, the augmented reality glasses 700 further include an image source (not shown) to provide an image beam. The image beam enters the right eye EY11 through reflection by a plurality of reflecting mirrors 721R on the light-transmitting plate 720PR, and enters the left eye EY12 through reflection by a plurality of reflecting mirrors 721L on the light-transmitting plate 720PL. The plurality of reflecting mirrors 721R are disposed in a first reflecting mirror configuration area 721RA in a two-dimensional manner, and the plurality of reflecting mirrors 721L are disposed in a second reflecting mirror configuration area 721LA in a two-dimensional manner, to optimize visible ranges and fields of view in both a vertical direction and a horizontal direction.

The first reflecting mirror configuration area 721RA and the second reflecting mirror configuration area 721LA both have a long side LS1 and a short side LS2. The long side LS1 is parallel to a direction of a connecting line of the right eye EY11 and the left eye EY12 of the user, and the short side LS2 is perpendicular to the direction of the connecting line of the right eye EY11 and left eye EY12 of the user. The long side LS1 is greater than 20 mm, and the short side LS2 is greater than 12 mm, to ensure that the visible ranges are greater than a size of a pupil in both of the horizontal direction and the vertical direction.

Based on the above, the augmented reality glasses provided in the embodiments of the invention reflect the image beam through the plurality of reflecting mirrors. Since the reflecting mirrors have a large depth of field, a large focusing range is provided for a virtual image. Therefore, a vergence-accommodation conflict can be avoided. In addition, the image beam has a larger width after being reflected by the reflecting mirrors, increasing the visible range. Optionally, the field of view may also be increased by adjusting orientations of the reflecting mirrors, so that the augmented reality glasses may avoid the vergence-accommodation conflict and provide a favorable visible range and a favorable field of view.

What is claimed is:

1. Augmented reality glasses adapted to be worn in front of an eye of a user, wherein the augmented reality glasses comprise:
at least one image source configured to provide at least one image beam to the eye, wherein the at least one image beam has a plurality of sub-beams; and
a plurality of reflecting mirrors disposed on a path of the at least one image beam to respectively reflect the sub-beams, wherein:
the at least one image beam has at least one first width before being incident on the reflecting mirrors and has at least one second width after being reflected by the reflecting mirrors, and the at least one second width is greater than the at least one first width, the reflecting mirrors corresponding to the eye are disposed in a reflecting mirror configuration area, the reflecting mirror configuration area has a long side and a short side, the long side is parallel to a direction of a connecting line of eyes of the user, the short side is perpendicular to the direction, the long side is greater than 20 mm, and the short side is greater than 12 mm.

2. The augmented reality glasses according to claim 1, wherein incident angles at which at least some of the sub-beams are respectively incident on at least some of the reflecting mirrors are different from each other.

3. The augmented reality glasses according to claim 1, wherein at least some of the reflecting mirrors are planar reflecting mirrors, and normal lines of the plurality of planar reflecting mirrors are not parallel to each other.

4. The augmented reality glasses according to claim 1, wherein at least some of the reflecting mirrors are curved reflecting mirrors.

5. The augmented reality glasses according to claim 1, further comprising at least one light-transmitting plate, wherein the at least one light-transmitting plate comprises at least one first surface away from the eye and at least one second surface close to the eye, and the reflecting mirrors are disposed on the at least one first surface.

6. The augmented reality glasses according to claim 5, wherein the at least one light-transmitting plate comprises at least one prism disposed on the path of the at least one image beam and has a first surface and a second surface, the at least one image source comprises a first image source and a second image source, a plurality of first sub-beams provided by the first image source are incident on at least some of the reflecting mirrors from the first surface of the prism, and a plurality of second sub-beams provided by the second image source are reflected by the at least one second surface of the at least one light-transmitting plate and are incident on at least some of the reflecting mirrors after being incident on the at least one light-transmitting plate from the second surface of the prism.

7. The augmented reality glasses according to claim 6, wherein an included angle between a normal line of the first surface of the prism and a normal line of the at least one second surface of the at least one light-transmitting plate is different from an included angle between a normal line of the second surface of the prism and the normal line of the at least one second surface of the at least one light-transmitting plate.

8. The augmented reality glasses according to claim 5, wherein the at least one light-transmitting plate comprises at least one third surface disposed on the path of the at least one image beam, the at least one image beam has at least one third width before penetrating the third surface and has at least one fourth width after penetrating the third surface, and the at least one fourth width is greater than the at least one third width.

9. The augmented reality glasses according to claim 5, wherein the at least one light-transmitting plate comprises at least one third surface disposed on the path of the at least one image beam, the at least one image beam has at least one first divergence angle before penetrating the third surface and has at least one second divergence angle after penetrating the third surface, and the at least one second divergence angle is greater than the at least one first divergence angle.

10. The augmented reality glasses according to claim 5, wherein the at least one light-transmitting plate comprises at least one third surface, and the third surface is disposed on the path of the at least one image beam and is a curved surface.

11. The augmented reality glasses according to claim 5, wherein the at least one light-transmitting plate comprises at least one third surface, and the third surface is disposed on the path of the at least one image beam and has a microstructure.

12. The augmented reality glasses according to claim 5, wherein the image source is a display panel.

13. The augmented reality glasses according to claim 12, wherein a display surface of the display panel provides the image beam.

14. The augmented reality glasses according to claim 13, wherein an included angle exists between the display surface of the display panel and the third surface of the light-transmitting plate, and the included angle is greater than or equal to zero degrees.

15. The augmented reality glasses according to claim 5, wherein light from an external object penetrates the light-transmitting plate to be transmitted to the eye.

16. The augmented reality glasses according to claim 15, wherein the light from the external object sequentially penetrates the first surface and the second surface to be transmitted to the eye.

17. The augmented reality glasses according to claim 1, wherein a maximum width of each of the reflecting mirrors is less than 3 mm.

18. The augmented reality glasses according to claim 1, wherein each of the reflecting mirrors is a mirror with a pinhole effect on the eye to increase a depth of field.

19. The augmented reality glasses according to claim 1, wherein the reflecting mirrors respectively reflect the sub-beams to the eye to form a virtual image in front of the eye.

20. Augmented reality glasses adapted to be worn in front of an eye of a user, wherein the augmented reality glasses comprise:

at least one image source configured to provide at least one image beam to the eye, wherein the at least one image beam has a plurality of sub-beams; and a plurality of reflecting mirrors disposed on a path of the at least one image beam to respectively reflect the sub-beams, wherein:

the at least one image beam has at least one first width before being incident on the reflecting mirrors and has at least one second width after being reflected by the reflecting mirrors, and the at least one second width is greater than the at least one first width, the augmented reality glasses further comprises at least one light-transmitting plate, wherein the at least one light-transmitting plate comprises at least one first surface away from the eye and at least one second surface close to the eye, and the reflecting mirrors are disposed on the at least one first surface, wherein the at least one light-transmitting plate comprises at least one prism disposed on the path of the at least one image beam and has a first surface and a second surface, the at least one image source comprises a first image source and a second image source, a plurality of first sub-beams provided by the first image source are incident on at least some of the reflecting mirrors from the first surface of the prism, and a plurality of second sub-beams provided by the second image source are reflected by the at least one second surface of the at least one light-transmitting plate and are incident on at least some of the reflecting mirrors after being incident on the at least one light-transmitting plate from the second surface of the prism.

21. Augmented reality glasses adapted to be worn in front of an eye of a user, wherein the augmented reality glasses comprise:

at least one image source configured to provide at least one image beam to the eye, wherein the at least one image beam has a plurality of sub-beams; and a plurality of reflecting mirrors disposed on a path of the at least one image beam to respectively reflect the sub-beams, wherein:

the at least one image beam has at least one first width before being incident on the reflecting mirrors and has at least one second width after being reflected by the reflecting mirrors, and the at least one second width is greater than the at least one first width, the augmented reality glasses further comprises at least one light-transmitting plate, wherein the at least one light-transmitting plate comprises at least one first surface away from the eye and at least one second surface close to the eye, and the reflecting mirrors are disposed on the at least one first surface, wherein the at least one light-transmitting plate comprises at least one third surface disposed on the path of the at least one image beam, the at least one image beam has at least one third width before penetrating the third surface and has at least one fourth width after penetrating the third surface, and the at least one fourth width is greater than the at least one third width.

* * * * *